_United States Patent_ [19]

Hines et al.

[11] Patent Number: 5,071,440

[45] Date of Patent: Dec. 10, 1991

[54] METHOD FOR TEMPORARILY COLORING ARTICLE WITH ACID LABILE COLORANT

[76] Inventors: John B. Hines, 246 Connecticut Ave.; John G. Lever, 316 Sundance Way, both of Spartanburg, S.C. 29302

[21] Appl. No.: 591,343

[22] Filed: Oct. 1, 1990

[51] Int. Cl.⁵ .................................................. D06P 5/13
[52] U.S. Cl. ............................................ 8/403; 8/636; 8/917; 8/918; 8/924
[58] Field of Search ................................................ 8/403

[56] References Cited

U.S. PATENT DOCUMENTS

| | | | |
|---|---|---|---|
| 3,157,633 | 11/1964 | Kuhn | 8/403 |
| 4,167,510 | 9/1979 | Brendle | 8/403 |
| 4,400,320 | 8/1983 | Keller et al. | 8/403 |
| 4,846,846 | 7/1989 | Rekers et al. | 8/515 |
| 4,877,411 | 10/1989 | Himes et al. | 8/403 |

_Primary Examiner_—A. Lionel Clingman
_Attorney, Agent, or Firm_—Timothy J. Monahan; H. William Petry

[57] ABSTRACT

An article may be temporarily colored by application of an aqueous solution of a polyoxyalkylene substituted chromophore characterized by a N=pair with an electron withdrawing group bonded to one element of the pair and an electron donating group bonded to the opposite element. The polyoxyalkylene substituent imparts solubility to the colorant and bulk to prevent penetration into interstices in the article being colored. The colorant may be subsequently decolorized in hydrolysis when an aqueous acid solution is applied to the colorant.

36 Claims, No Drawings

METHOD FOR TEMPORARILY COLORING ARTICLE WITH ACID LABILE COLORANT

BACKGROUND OF THE INVENTION

1. Field of the Invention

The present invention relates to the use of acid labile colorants which may be decolorized by acid hydrolysis. In particular, the invention relates to acid labile colorants in the form of polyoxyalkylene substituted azomethine and indophenol chromophores.

2. Prior Art

Fugitive tints which have achieved wide acceptance in the textile industry include the polyethyleneoxy-substituted tints described in Kuhn, U.S. Pat. No. 3,157,633. These tints are normally applied to yarn such as nylon yarn before heat setting. Such tints are a combination of a dyestuff radical and one or more polyethyleneoxy groups. Dyestuff radicals disclosed in the patent above include nitroso, nitro, azo, diphenylmethane, triarylmethane, xanthene, acridine, methine, thiazole, indamine, azine, oxazine, and o-anthraquinone radicals. Preferably, such radicals may be attached to the polymeric constituents of the tint composition by an amino nitrogen.

Fugitive coloration of nylon in particular presents special problems since the tinted yarn, or fabric woven or knitted therefrom, may be subjected to a heat-setting treatment, usually with steam. This heat-setting treatment can at times fix the tint in the fibers so that the yarns remain stained or colored, and the tint cannot be removed readily in later finish-scouring operations. Special and inconvenient reducing or oxidizing treatments to remove the tint may therefore be required.

Also, with the advent of improved continuous carpet dyeing techniques (such as the Kuster Dyer) scouring of the carpet with copious quantities of water is becoming unnecessary and, in fact, may be undesirable, except for the necessity of removing the fugitive tint. These continuous carpet dye ranges are being run at higher speed in order to increase production, further reducing the amount of scouring time that a fugitive tint would experience during dyeing.

Previously, consumers chose darker shades of carpet because they were easier to maintain and did not easily show stains. If the traditional fugitive tint inadvertently left some color on a dark colored carpet, it was often not detectable and did not detract from the appearance of the carpet. With the advent of stain-blocker technologies, consumers are choosing lighter shades of carpet because it is now possible to clean and maintain light colored carpet as easily as dark colored carpet. If any residual fugitive tint is left on light colored carpet, it is more easily noticed and is more likely to detract from the appearance of the carpet.

Furthermore, while conventional fugitive tints have in the past generally been applied at levels below about 0.2% of tint based upon the weight of the fiber, at the present time increasing tint levels are being called for to maintain proper identification of yarn ends during carpet tufting operations. When conventional fugitive tints are used at such higher levels, e.g., above about 0.2%, removal of all of the tint may become increasingly difficult or impossible.

SUMMARY OF THE INVENTION

Therefore, an object of the invention is to provide a colorant suitable as a fugitive tint for textile fibers which can be used with heat setting treatment, lighter shades of product and at increased tint levels.

Another object of the invention is to provide a process whereby residual tint not removed from a textile fiber is decolorized. A further object is to provide a decolorization process which may be easily adapted to existing dyeing and stain-blocker treatments.

Still another object of the invention is to provide a colorant suitable for use as a washable ink which may be decolorized to prevent permanent staining.

Accordingly, a process for temporarily coloring an article is provided by applying a colorant solution in the form of a polyoxyalkylene substituted chromophore to the article. The chromophore is selected from azomethine and indophenol chromophores characterized by a carbon-nitrogen pair joined by a double bond. The polyoxyalkylene substituent is a straight or branched polymer chain of at least 10 monomers selected from ethylene oxide, propylene oxide and glycidol. The colorant is provided in an amount sufficient to provide coloration to the solution. The colorant is decolorized by hydrolysis of the carbon-nitrogen pair by the addition of an aqueous acid, having a pH of 5 or less, to the colorant.

The invention features embodiments which are water soluble for easy application and clean up. The invention also features relatively high molecular weight chromophore which resist penetration into the interstices of textile fibers. Thus, the polyoxyalkylene substituted chromophores herein have an advantage over other acid labile tints which may penetrate deeply within the fiber and become difficult to hydrolyze. Another advantage of the present invention is that decolorization of textile fibers may be achieved during typical acid dyeing and stain-blocker treatment and without the need to add process steps.

DESCRIPTION OF THE PREFERRED EMBODIMENT

Without limiting the scope of the invention, the preferred features of the invention are hereinafter set forth.

The colorants useful in the present invention are characterized by a chromophore containing a C=N bond, referred to herein as a carbon-nitrogen pair. An electron withdrawing group to one element of the pair and an electron donating is bonded to an opposite element of the pair. Strong electron donating and withdrawing groups are recommended to facilitate subsequent hydrolysis. Preferably, two electron withdrawing groups or two electron donating groups are bonded to carbon. Compounds suitable for use may be found in the class of azomethine and indophenol chromophores.

By way of example and not limitation, suitable electron withdrawing groups are: selected from $NO_2$, CN, cyanophenyl, nitrophenyl, alkyl ester, ketone, aryl ester, aldehyde, sulfonic acid, carboxylic acid, ammonium ion and vinyl ketone groups, and said electron donating group is selected from: arylamine, arylalkoxide and alkylaryl groups.

In addition to the presence of electron donating and withdrawing groups, the chromophores of interest herein may be substituted with a variety of compounds known to those with skill in the art which shift the absorption spectrum of the chromophore or intensify its color, without deviating from the spirit of the invention.

The colorants useful herein are further characterized by one or more polyoxyalkylene substituents covalently bonded to the chromophore. The polyoxyalkylene substituents are straight or branched polymers of primarily ethylene oxide, propylene oxide and glycidol monomers. Minor amounts of butylene oxide and other compatible monomers may be present in amounts not to exceed 25%. The polyoxyalkylene substituents contain at least 10 monomers units selected from ethylene oxide, propylene oxide and glycidol. In a preferred embodiment, all of the polyoxyalkylene substituents combined, typically from one to six substituents, contain from 20 to 400 ethylene oxide, propylene oxide and/or monomer units, and more preferably from 50 to 400 of such monomer units.

In order to enhance water solubility of the colorant, at least 50% of the monomer units of the polyoxyalkylene substituent should be comprised of ethylene oxide units, and preferably, at least 75% of the monomers are ethylene oxide. Glycidol monomers can be incorporated into the polyoxyalkylene substituent to promote branching. Substituents having glycidol monomers within ten monomer units of the chromophore appear to provide greater stability to the chromophore in solution. In a preferred embodiment, less than 20% of the monomer units are glycidol.

Propylene oxide may be advantageously added onto the polyoxyalkylene substituent directly after the glycidol units.

The propylene oxide reacts with the primary hydroxyl sites of glycidol and provides a secondary hydroxyl site for further chain growth. Additional alkylene oxide monomer units may react with either the secondary hydroxyl site of the recently added propylene oxide or with the secondary hydroxyl site of the glycidol units to achieve branching. Preferably, less than 50% of the monomer units in the polyoxyalkylene substituent is propylene oxide, and more preferably less than 20% of the monomer units are propylene oxide.

The polyoxyalkylene substituents are covalently linked to the chromophores by a linking agent such as N, O, S, $CO_2$, $SO_2$, $SO_2N$ and $CON$. When nitrogen is used as the linking agent, typically two polyoxyalkylene substituents are linked to the chromophore.

Examples of suitable end groups on the polyoxyalkylene substituent are H, alkyl, acetyl, ketone, aryl and benzoyl groups. Alternatively, a terminal oxygen of the substituent chain may be substituted with Cl, Br or F.

Synthesis of chromophores containing polyoxyalkylene substituents and fugitive colorants are disclosed in Kuhn, U.S. Pat. No. 3,157,633, Brendle, U.S. Pat. No. 4,167,510 and Cross et al., U.S. Pat. No. 4,284,729 incorporated by reference herein.

For most applications, the colorant is not applied to an article at full strength, but rather is dispersed or dissolved in a suitable carrier or solvent. Depending upon the particular application, concentrations of colorant in solution from 0.5 weight percent to 50 weight percent are useful. Preferably, the colorant solution contains from 1 weight percent to 40 weight percent colorant. Examples of suitable solvents are water, propylene glycol, ethylene glycol, $C_1$-$C_4$ alcohols and methylene chloride. In most instances, for considerations of cost, toxicity and availability, water is preferred. If the colorant is not a liquid at room temperature, it may be heated to slightly above its melting point before blending with a solvent.

In the first step of the invention, the solution containing suitable concentration of colorant, at least enough colorant to visibly color the solution, is applied to an article. In one embodiment, the solution is applied to a textile fiber to maintain identification of the fiber during subsequent weaving, knitting or tufting operations. The solution may be applied to the textile fiber by any of a variety of methods known in the art, such as mixing the solution with a lubricant and spraying it on the fiber.

The invention is applicable to virtually every known textile fiber and is especially useful with fibers that stain easily, such as synthetic polyamides, cotton, wool and silk. In particular, the invention is useful as a fugitive tint for nylon 6 and nylon 6,6 fibers.

The colorant solution may be employed as an ink. For example, the solution may be applied to a writing surface with a felt tip pen applicator. The colorant may be removed from hands and clothing by washing due to the enhanced water solubility of the chromophore, especially when a large percentage of polyoxyalkylene monomers are ethylene oxide.

However, as discussed previously, even a small amount of residual colorant on lighter shades of textile materials and clothing is undesirable. Due to the unique structure of the chromophores employed in the invention, residual colorant can be decolorized by hydrolysis with an application of an acid solution to the colorant. The colorant may be hydrolyzed regardless of whether it has dried on the article or been heat set.

Preferably, the acid solution is aqueous and has a pH of 5 less, and more preferably, a pH of 3 or less. Application of the acid solution at higher temperatures and lower pH enhances hydrolysis of the colorant. However, the invention may be practiced at room temperatures.

In many fugitive tint applications, the textile fibers are acid dyed, treated with a stain-blocker or both. Dyeing and stain-blocker treatments are typically performed at a pH of 3 or less and at temperatures of between 40° C. and 100° C. Hydrolysis of the C=N pair of the chromophore occurs soon after contact with the acid solution.

Alternatively, the colorant can be removed from articles of clothing by brief soaking in a dilute acid solution such as citric acid or acetic acid. A solution of the colorant applied as an ink may be wiped with a swab soaked in dilute sulfuric acid. The colorant is easily decolorized, even after it has dried on writing paper.

The invention may be further understood by reference to the following examples, but the invention is not to be construed as being unduly limited thereby. Unless otherwise indicated, all parts and percentages are by weight.

EXAMPLE 1

Synthesis of
N,N-bis(hydroxyethylpolyoxyethylene)aniline (I)

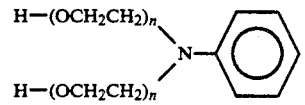

Ninety three grams of aniline were allowed to react with 4400 grams ethylene oxide in the presence of potassium hydroxide following well known ethoxylation procedures. About 100 molar equivalents of ethylene oxide were thus added to the starting material.

EXAMPLE 2

Synthesis of
N,N-bis(hydroxyethylpolyoxyethylene)-4-nitrosoaniline (II)

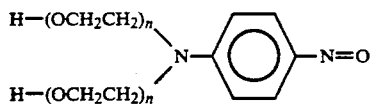

Two hundred twenty-five grams of N,N-bis(hydroxyethylpolyoxyethylene)aniline (I where n=50) were heated in a three liter, three-necked, round-bottomed flask until the material had melted A solution of 15 g concentrated HCl in 115 ml water was charged to the flask and is thoroughly mixed. The resulting solution was then cooled to 5° C. and kept under a nitrogen atmosphere. A solution of 3.7 g sodium nitrite in 20 ml water was slowly added. The solution was allowed to stir for one hour, then it was cut to 65% solids with water and bottled.

EXAMPLE 3

Synthesis of
N,N-bis(acetoxyethylpolyoxyethylene)-4-formylaniline (III)

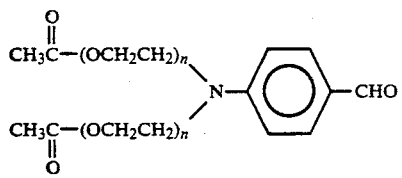

Two hundred twenty grams of N,N-bis(hydroxyethylpolyoxyethylene)aniline (I where n=50) were heated in a three liter, three-necked, round-bottomed flask until the material had melted. 20 g acetic anhydride was added to the melted material which was then heated to 100° C. and stirred for two hours. The product was then cooled and 50 ml water was added. The reaction mixture was vacuum stripped to dryness. Two hundred grams of the dried product and 100 g N,N-dimethylformamide were charged to a 3-L, three-necked, round-bottomed flask and heated to 44° C. under a nitrogen blanket. Seventy-five grams phosphorus oxychloride were then charged dropwise to the reaction mixture. The mixture was continually stirred and the temperature was kept below 47° C. for the entire addition. The reaction was heated to 90° C. and held there for 1.5 hrs. The reaction mixture was cooled to 40° C. and then neutralized slowly with caustic. The product mixture was vacuum stripped to dryness.

EXAMPLE 4

Synthesis of
N,N-bis(hydroxyethylpolyoxyethylene)-4-aminoaniline (IV)

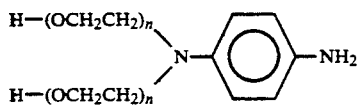

A solution of 226 g of N,N-bis(hydroxyethylpolyoxyethylene)-4-nitrosoaniline (II where n=50) in 115 ml of water was made. A solution of 22 g concentrated HCl in 50 ml water was charged to the first solution. Then, 8.8 g powdered zinc metal was slowly added while maintaining the reaction below 25° C. After the addition of the zinc and the exotherm of the reaction had stopped, the reaction was allowed to stir for 24 hrs at room temperature. The reaction was then neutralized with saturated sodium bicarbonate, filtered, and vacuum stripped to dryness.

EXAMPLE 5

Synthesis of
N,N-bis(hydroxyethylpolyoxyethylene)-m-toluidine (V)

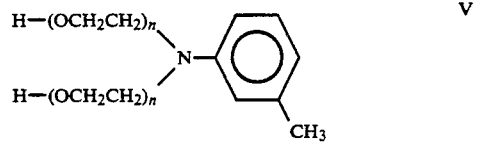

A solution of 1369 of m-toluidine in 200 ml toluene was allowed to react with 88 g of ethylene oxide following well known ethoxylation procedures. Then 3 g potassium hydroxide followed by 4312 g of ethylene oxide were charged to the reaction which was allowed to proceed by means of well known ethoxylation procedures. About 100 molar equivalents were thus added to the starting material. The toluene was vacuum stripped from the product.

EXAMPLE 6

Synthesis of
N,N-bis(hydroxyethylpolyoxyethylene)-4-nitroso-m-toluidine (VI)

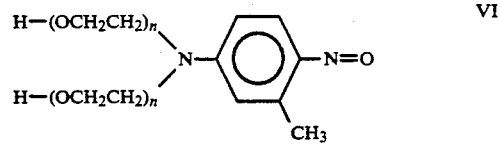

Two hundred sixty-eight grams of N,N-bis(hydroxyethylpolyoxyethylene)-m-toluidine (V, n=50) was heated in a three liter, three-necked, round-bottomed flask until the material was melted. A solution of 15 g concentrated HCl in 115 ml water was charged to the flask and was thoroughly mixed. The resulting solution was then cooled to 5° C. and kept under a nitrogen atmosphere. A solution of 3.7 g sodium nitrite in 20 ml water was slowly added. The solution was allowed to stir for one hour, and then it was cut to 65% solids and bottled.

EXAMPLE 7

Synthesis of
N,N,O-tris(hydroxyethylpolyoxyethylene)-m-aminophenol (VII)

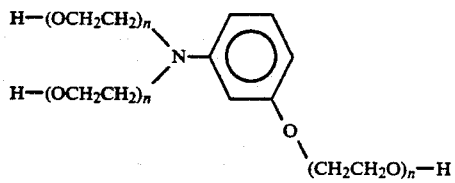

A solution of 109 g of m-aminophenol in 200 ml toluene was allowed to react with 132 g of ethylene oxide following well known ethoxylation procedures. Then 3 g potassium hydroxide followed by 4268 g of ethylene oxide were charged to the reaction which was allowed to proceed by means of well known ethoxylation procedures. About 100 molar equivalents were thus added to the starting material. The toluene was vacuum stripped from the product.

EXAMPLE 8

Synthesis of
N,N,O-tris(hydroxyethylpolyoxyethylene)-6-nitroso-3-aminophenol (VIII)

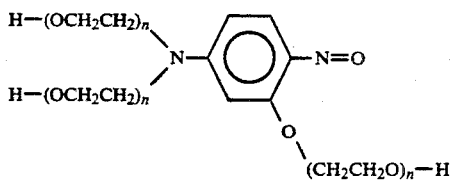

Two hundred fifty-five grams of N,N,O-tris(hydroxyethylpolyoxyethylene)-m-aminophenol (VII, n=33.3) were heated in a three liter, three-necked, round-bottomed flask until the material was melted. A solution of 15 g concentrated HCl in 115 ml water was charged to the flask and was thoroughly mixed. The resulting solution was then cooled to 5° C. and kept under a nitrogen atmosphere. A solution of 3.7 g sodium nitrite in 20 ml water was slowly added. The solution was allowed to stir for one hour, and then it was cut to 65% solids and bottled.

EXAMPLE 9

Synthesis of
N,N-bis(hydroxyethylpolyoxyethylenepolyoxypropyleneoxyethylene)aniline (IX)

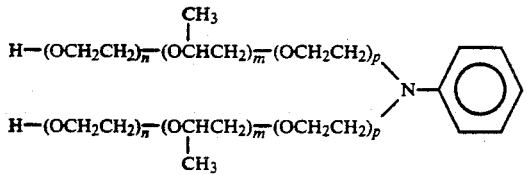

Ninety three grams of aniline were allowed to react with 88 grams ethylene oxide following well known ethoxylation procedures. Two grams of potassium hydroxide were then charged to the reaction flask and 1740 g of propylene oxide were then added following well known propoxylation procedures. Another 3080 g ethylene oxide were then added to the reaction mixture. About 72 molar equivalents of ethylene oxide and 30 molar equivalents of propylene oxide were thus added to the starting material.

EXAMPLE 10

Synthesis of
N,N-bis(hydroxyethylenepolyoxyethyleneployoxypropylene)aniline (X)

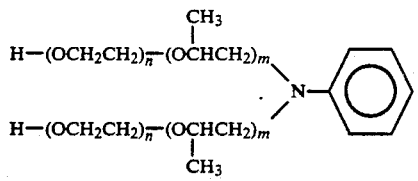

Ninety three grams of aniline were allowed to react with 88 grams ethylene oxide following well known ethoxylation procedures. Two grams of potassium hydroxide were then charged to the reaction flask and 4972 g of ethylene oxide were then added following well known propoxylation procedures. Another 2030 g propylene oxide were then added to the reaction mixture. About 115 molar equivalents of ethylene oxide and 35 molar equivalents of propylene oxide were thus added to the starting material.

EXAMPLE 11

Synthesis of
N,N-oxyethylpolyoxyethylenepolyoxypropyleneoxyethylene)-4-nitrosoaniline (XI)

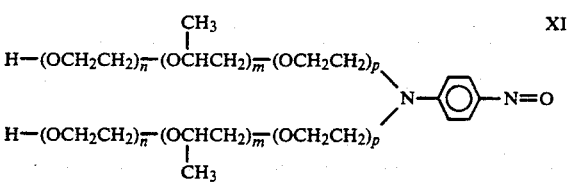

Two hundred fifty grams of N,N-bis(hydroxyethylenepolyoxyethyleneployoxypropylene)aniline (IX where n=35, m=15, p=1) were heated in a three liter, three-necked, round-bottomed flask until the material had melted. A solution of 15 g concentrated HCl in 115 ml water was charged to the flask and was thoroughly mixed. The resulting solution was then cooled to 5° C. and kept under a nitrogen atmosphere. A solution of 3.7 g sodium nitrite in 20 ml water was slowly added. The solution was allowed to stir for one hour, then it was cut to 65% solids with water and bottled.

EXAMPLE 12

Synthesis of
N,N-bis(hydroxyethylpolyoxyethylenepolyoxypropylene)-4-nitrosoaniline (XII)

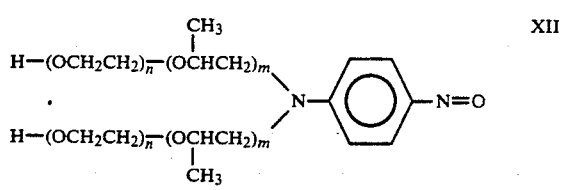

Three hundred fifty-nine grams of N,N-bis(hydroxyethylpolyoxyethylenepolyoxypropylene)aniline (X where n=56.5 and m=17.5) were heated in a three liter, three-necked, round-bottomed flask until the material had melted. A solution of 15 g concentrated HCl in 115 ml water was charged to the flask and was thoroughly mixed. The resulting solution was then cooled to 5° C. and kept under a nitrogen atmosphere. A solution of 3.7 g sodium nitrite in 20 ml water was slowly added. The solution was allowed to stir for one hour, then it was cut to 65% solids with water and bottled.

EXAMPLE 13

Synthesis of N,N-bis(hydroxyethylpolyoxyethylene, polyglycidol)aniline (XIII)

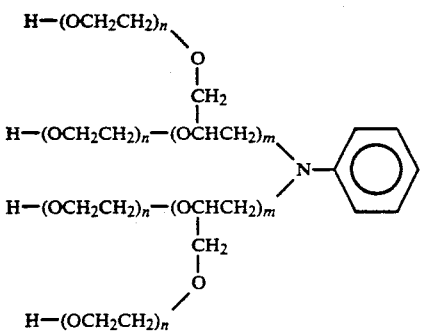

Ninety three grams of aniline were allowed to react with 296 grams glycidol by heating the aniline to 130° C. and dripping the glycidol in slowly under a nitrogen atmosphere. The product was then allowed to react with 8800 grams ethylene oxide in the presence of potassium hydroxide following well known ethoxylation procedures. About 200 molar equivalents of ethylene oxide were thus added to the starting material.

EXAMPLE 14

Synthesis of N,N-bis(hydroxyethylpolyoxyethylene, polyglycidol)-4-nitrosoaniline (XIV)

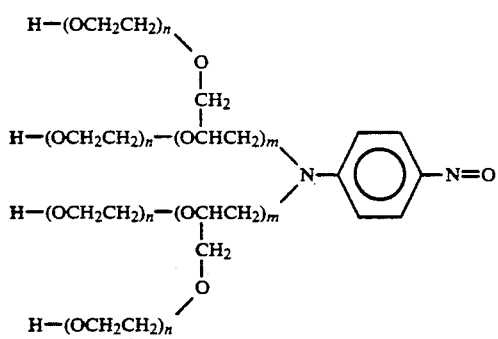

Four hundred fifty-nine grams of N,N-bis(hydroxyethylpolyoxyethylene, polyglycidol)aniline (XIII, n=3, m=2) are heated in a three liter, three-necked, round-bottomed flask until the material has melted. A solution of 15 g concentrated HCl in 115 ml water was charged to the flask and was thoroughly mixed. The resulting solution was then cooled to 5° C. and kept under a nitrogen atmosphere. A solution of 3.7 g sodium nitrite in 20 ml water was slowly added. The solution was allowed to stir for one hour, then it was cut to 65% solids with water and bottled.

EXAMPLE 15

Synthesis of N,N-bis(hydroxyethylpolyoxyethylene, polyoxypropylene, polyglycidol)-m-toluidine (XV)

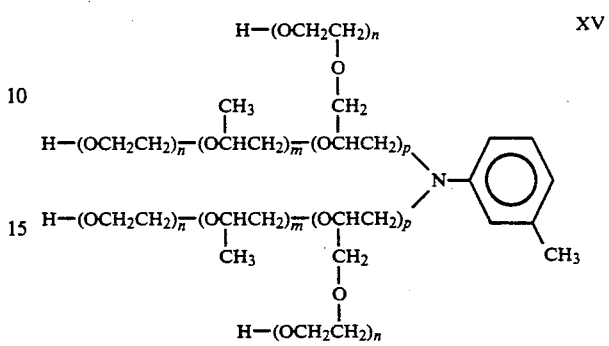

Ninety three grams of aniline were allowed to react with 296 grams glycidol by heating the aniline to 130° C. and dripping the glycidol in slowly under a nitrogen atmosphere. The product was then allowed to react with 232 grams propylene oxide followed by 8800 grams ethylene oxide in the presence of potassium hydroxide following well known ethoxylation procedures. About 4 molar equivalents of propylene oxide and 200 molar equivalents of ethylene oxide were thus added to the starting material.

EXAMPLE 16

Synthesis of N,N-bis(hydroxyethylpolyoxyethylene, polyoxypropylene, polyglycidol)-4-nitroso-m-toluidine (XVI)

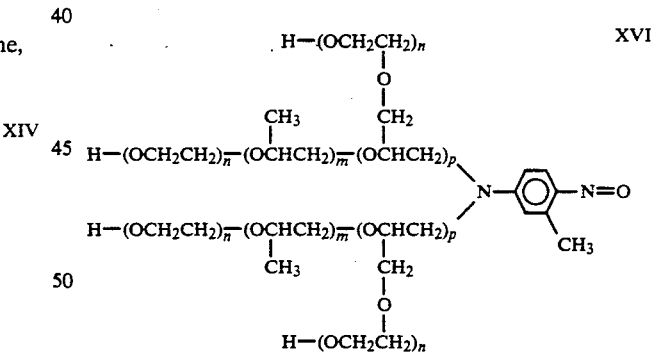

Four hundred seventy-two grams of N,N-bis(hydroxyethylpolyoxyethylene, polyoxypropylene, polyglycidol)-m-toluidine (XV, n=33.3, m=1, p=2) were heated in a three liter, three-necked, round-bottomed flask until the material has melted. A solution of 15 g concentrated HCl in 115 ml water was charged to the flask and was thoroughly mixed. The resulting solution was then cooled to 5° C. and kept under a nitrogen atmosphere. A solution of 3.7 g sodium nitrite in 20 ml water was slowly added. The solution was allowed to stir for one hour, then it was cut to 65% solids with water and bottled.

EXAMPLE 17

Synthesis of N,N-bis(hydroxyethylpolyoxyethylene, polyoxypropylene, polyglycidol)-m-anisidine (XVII)

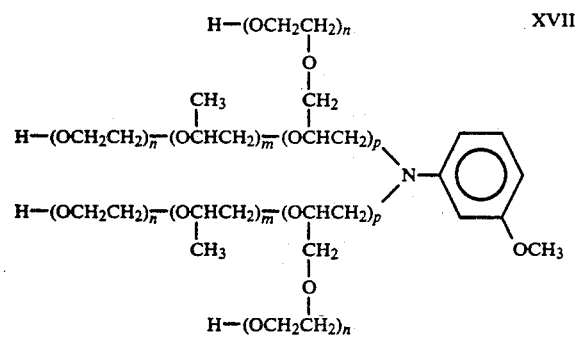

One hundred twenty-three grams of m-anisidine were allowed to react with 296 grams glycidol by heating the m-anisidine to 130° C. and dripping the glycidol in slowly under a nitrogen atmosphere. The product was then allowed to react with 232 grams propylene oxide followed by 8800 grams ethylene oxide in the presence of potassium hydroxide following well known ethoxylation procedures. About 4 molar equivalents of propylene oxide and 200 molar equivalents of ethylene oxide were thus added to the starting material.

EXAMPLE 18

Synthesis of N,N-bis(hydroxyethylpolyoxyethylene, polyoxypropylene, polyglycidol)-4-nitroso-m-anisidine (XVIII)

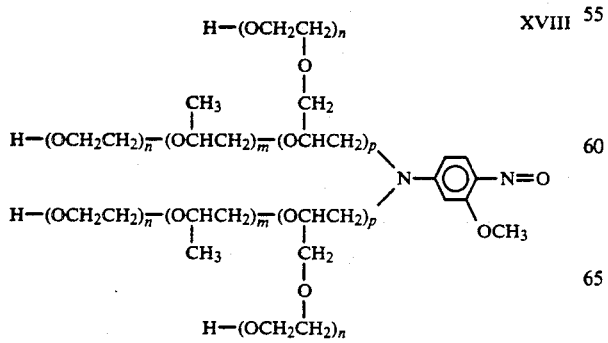

Four hundred seventy-nine grams of N,N-bis(hydroxyethylpolyoxyethylene, polyoxypropylene, polyglycidol)-m-anisidine (XVII, $n=33.3$, $m=1$, $p=2$) were heated in a three liter, three-necked, round-bottomed flask until the material has melted. A solution of 15 g concentrated HCl in 115 ml water was charged to the flask and was thoroughly mixed. The resulting solution was then cooled to 5° C. and kept under a nitrogen atmosphere. A solution of 3.7 g sodium nitrite in 20 ml water was slowly added. The solution was allowed to stir for one hour, then it was cut to 65% solids with water and bottled.

EXAMPLE 19

Synthesis of N,N,O-tris(hydroxyethylpolyoxyethylene, polyoxypropylene, polyglycidol)-m-aminophenol (XIX)

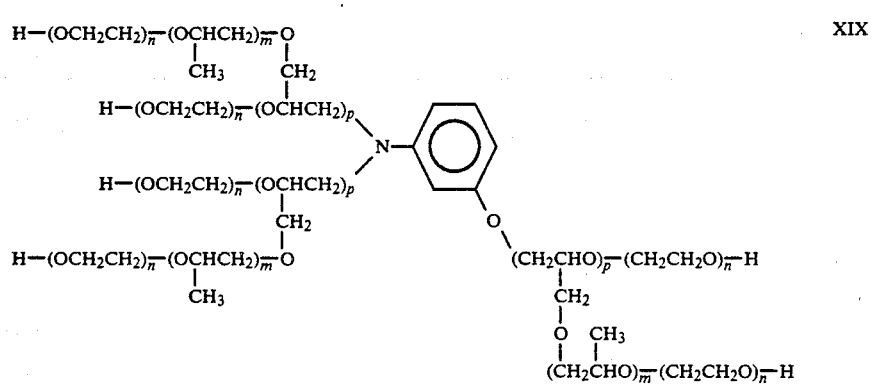

One hundred nine grams of m-aminophenol were allowed to react with 296 grams glycidol by heating the m-aminophenol to 130° C. and dripping the glycidol in slowly under a nitrogen atmosphere. The product was then allowed to react with 232 grams propylene oxide followed by 8800 grams ethylene oxide in the presence of potassium hydroxide following well known ethoxylation procedures. About 4 molar equivalents of propylene oxide and 200 molar equivalents of ethylene oxide were thus added to the starting material.

EXAMPLE 20

Synthesis of N,N,O-tris(hydroxyethylpolyoxyethylene, polyoxypropylene, polyglycidol)-4-nitroso-m-aminophenol (XX)

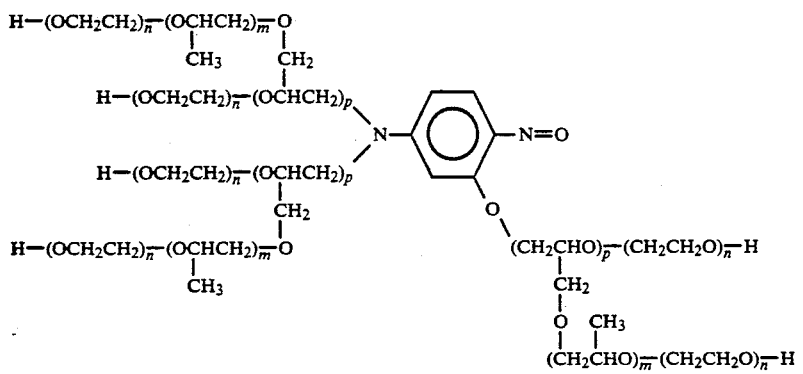

XX

Four hundred seventy-two grams of N,N,O-tris(hydroxyethylpolyoxyethylene, polyoxypropylene, polyglycidol)-m-aminophenol (XIX, n=29.5, m=0.8, p=1.7) were heated in a three liter, three-necked, round-bottomed flask until the material has melted. A solution of 15 g concentrated HCl in 115 ml water was charged to the flask and was thoroughly mixed. The resulting solution was then cooled to 5° C. and kept under a nitrogen atmosphere. A solution of 3.7 g sodium nitrite in 20 ml water was slowly added. The solution was allowed to stir for one hour, then it was cut to 65% solids with water and bottled.

EXAMPLE 21

Synthesis of N,N-bis(acetoxyethylpolyoxyethylene)-4-aminobenzylidene amino-6-methoxybenzothiazole Tint (XXI)

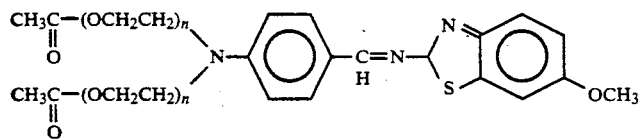

XXI

A solution of 92 g N,N-bis(acetoxyethylpolyoxyethylene)-4-formylaniline (III, n=100) and 32 ml water was mixed with 3.6 g 2-amino-6-methoxybenzothiazole and 0.5 g morpholine and heated to 90° C. for one hour. The reaction was then vacuum stripped to remove the water and the morpholine. The yellow tint was then cut the desired absorbency and bottled.

EXAMPLE 22

Synthesis of N,N-bis(hydroxyethylpolyoxyethlene)-4-amino-m-toluidine cyano-4-nitrobenzylidene Tint (XXII)

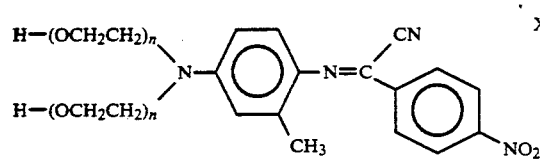

XXII

A solution of 123 g of 65% N,N-bis(hydroxyethylpolyoxyethylene)-4-nitroso-m-toluidine (VI, n=100) in water was mixed with 3.2 g 4-nitrophenylacetonitrile and 0.5 g morpholine and heated to 90° C. for one hour. The reaction was then vacuum stripped to remove the water and the morpholine. The red tint was then cut the desired absorbency and bottled.

EXAMPLE 23

Synthesis of N,N-bis(hydroxyethylpolyoxyethylene)-4-amino-m-toluidine 5-hydroxynaphthylidene Tint (XXIII)

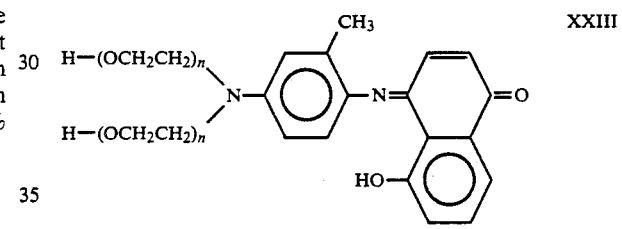

XXIII

A solution of 123 g of 65% N,N-bis(hydroxyethylpolyoxyethylene)-4-nitroso-m-toluidine (VI, n=100) in water was mixed with 3.2 g 1,5-naphthalenediol and 0.5 g morpholine and heated to 90° C. for one hour. The reaction was then vacuum stripped to remove the water and the morpholine. The blue tint was then cut the desired absorbency and bottled.

EXAMPLE 24

Synthesis of N,N-bis(hydroxyethylpolyoxyethylene)-4-aminoaniline 2-cyano-2'-cyanobenzylidene Tint (XXIV)

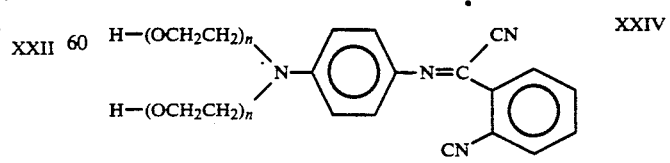

XXIV

A solution of 122 g of 65% N,N-bis(hydroxyethylpolyoxyethylene)-4-nitrosoaniline (II, n =50) in water was mixed with 2.8 g 2-cyano-o-tolunitrile and 0.5 g morpholine and heated to 90° C. for one hour. The reaction was then vacuum stripped to remove the water and the morpholine. The orange tint was then cut the desired absorbency and bottled.

EXAMPLE 25

Synthesis of N,N-bis(hydroxyethylpolyoxyethylene)-4-aminoaniline dicyanomethine Tint (XXV)

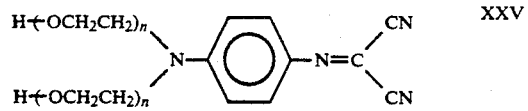

A solution of 122 g of 65% N,N-bis(hydroxyethyl-polyoxyethylene)-4-nitrosoaniline (II, n=50) in was mixed with 1.3 g malononitrile and 0.5 g morpholine and heated to 90° C. for one hour. The reaction was then vacuum stripped to remove the water and the morpholine. The orange tint was then cut the desired absorbency and bottled.

EXAMPLE 26

Synthesis of N,N-bis(hydroxyethylpolyoxyethylene)-4-aminoaniline-3-nitrobenzylidene Tint (XXVI)

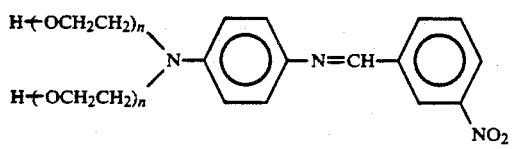

A solution of 90 g N,N-bis(hydroxyethylpolyoxyethylene)-4-aminoaniline (IV, n=50) and 32 ml water was mixed with 3.0 g 3-nitrobenzaldehyde and 0.5 g morpholine and heated to 90° C. for one hour. The reaction was then vacuum stripped to remove the water and the morpholine. The yellow tint was then cut the desired absorbency and bottled.

EXAMPLE 27

Synthesis of N,N,O-tris(hydroxyethylpolyoxyethylene, polyoxypropylene, polyglycidol)-4-amino-3-hydroxyanilinedi(ethylformate)methine Tint (XXVII)

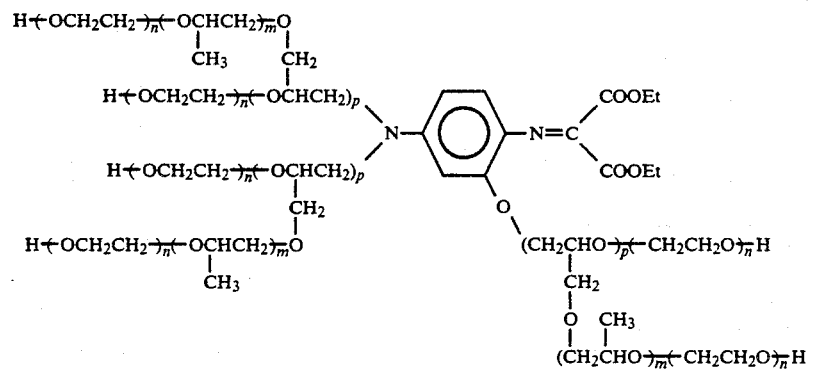

A solution of 170 g (XX, n=29.5, m=0.8, p =1.7) was mixed with 1.6 g diethylmalonate and 0.5 g morpholine and heated to 90° C. for one hour. The reaction was then vacuum stripped to remove the water and the morpholine. The yellow tint was then cut the desired absorbency and bottled.

EXAMPLE 28

Synthesis of N,N-bis(hydroxyethylpolyoxyethylene, polyglycidol)-4-aminoaniline dicyanomethine Tint (XXVIII)

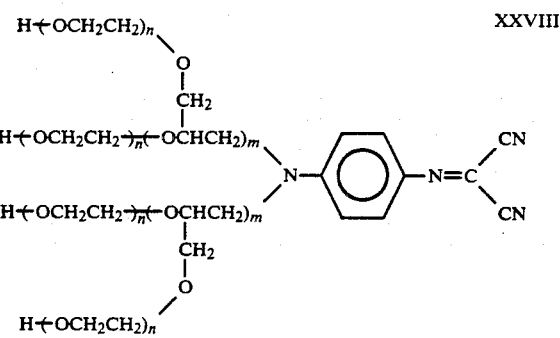

A solution of 110 g N,N-bis(hydroxyethylpolyoxyethylene, polyglycidol)-4-nitrosoaniline (XIV, n=16.7, m=2) cut to a 55.6% solution in water, was mixed with 0.6 g malononitrile and 0.5 g morpholine and heated to 90° C. for one hour. The reaction was then vacuum stripped to remove the water and the morpholine. The orange tint was then cut the desired absorbency and bottled.

EXAMPLE 29

Synthesis of N,N,O-tris(hydroxyethylpolyoxyethylene, polyoxypropylene, polyglycidol)-4-amino-3-hydroxyaniline-cyano-2-cyanobenzylidene Tint (XXIX)

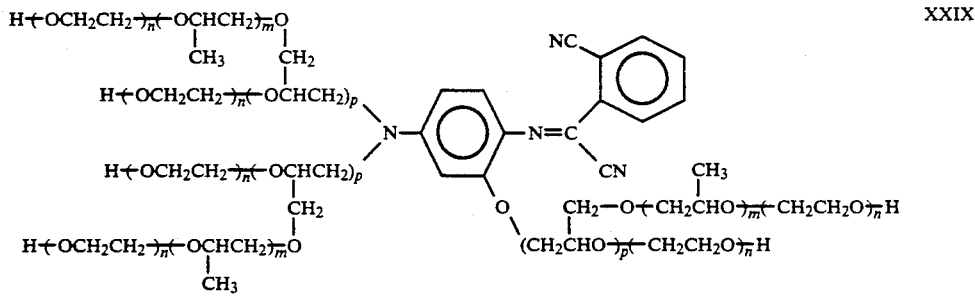

A solution of 170 g XX, n=25, m=0.8, p=1.7) with 44.6% water was mixed with 1.4 g 2'-cyano-o-tolunitrile and 0.5 g morpholine and heated to 90° C. for one hour. The reaction was then vacuum stripped to remove the water and the morpholine. The red tint was then cut the desired absorbency and bottled.

EXAMPLE 30

Synthesis of N,N-bis(hydroxyethylpolyoxyethylene, polyglycidol)-4-aminoaniline benzoylnitromethine Tint (XXX)

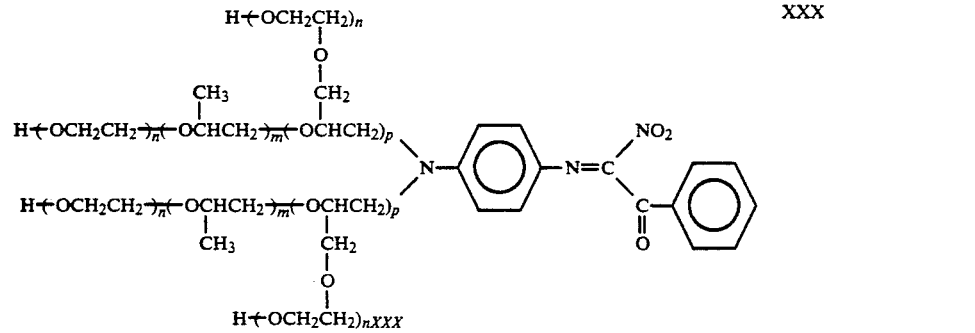

A solution of 110 g N,N-bis(hydroxyethylpolyoxyethylene, polyglycidol)-4-nitrosoaniline (XIV, n=33.3, m=2) cut to a 55.6% solution in water, was mixed with 1.7 g benzolynitromethane and 2 ml morpholine and heated to 110° C. for one hour. The reaction was then vacuum stripped to remove the water and the morpholine. The yellow tint was then cut the desired absorbency and bottled.

EXAMPLE 31

Synthesis of N,N-bis(hydroxyethylpolyoxyethylene, polyoxypropylene, polyglycidol)-4-amino-m-anisidine-4-nitrophenylcyanomethine Tint (XXXI)

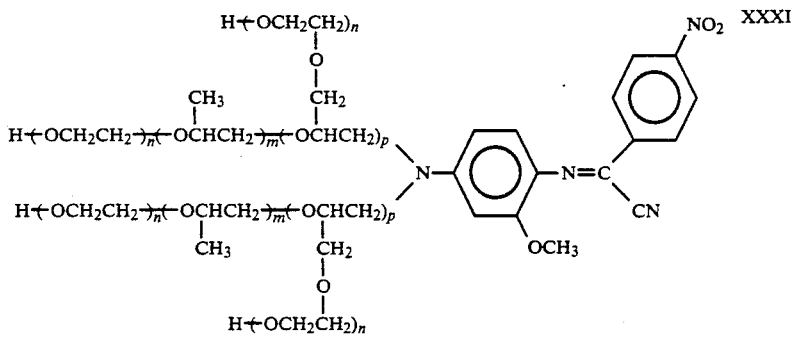

A solution of 100 g (XVIII, n=35.3, m=1, p=2) was mixed with 1.6 g 4-nitrophenylacetonitrile and 2 ml morpholine and heated to 60° C. for one hour. The reaction was then vacuum stripped to remove the water and the morpholine. The purple tint was then cut the desired absorbency and bottled.

EXAMPLE 32

Synthesis of N,N-bis(hydroxyethylpolyoxyethylene, polyoxypropylene, polyglycidol)-4-amino-m-toluidine-4-nitrophenylcyanomethine Tint (XXXII)

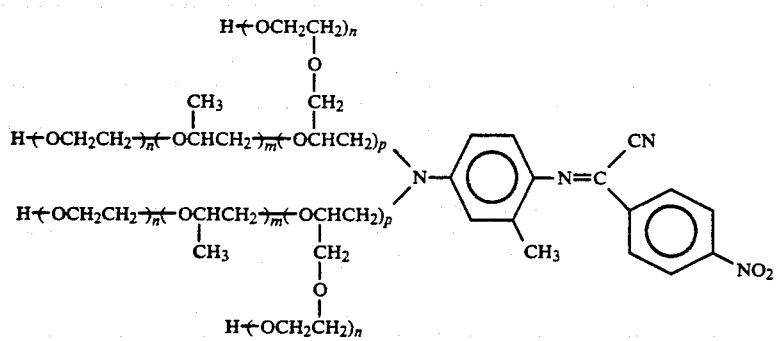

A solution of 177.5 g (XVI, n=33.3, m=1, p=2, 55% solids) was mixed with 1.6 g 4-nitrophenylacetonitrile and 2 ml morpholine and heated to 60° C. for one hour. The reaction was then vacuum stripped to remove the water and the morpholine. The purple tint was then cut the desired absorbency and bottled.

EXAMPLE 33

Synthesis of N,N-bis(hydroxyethylpolyoxyethylenepolyoxypropyleneoxyethylene)-4-aminoaniline 5-hydroxynaphthylidene Tint (XXXIII)

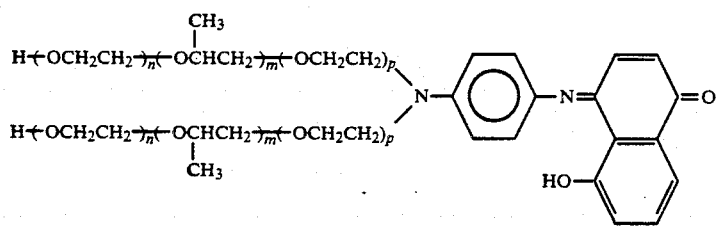

A solution (50% solids in water) of 76 g bis(hydroxyethylpolyoxyethylenepolyoxypropyleneoxyethylene)-4-nitrosoaniline (XI, n=35, m=15, p=1) was mixed with 1.6 g 1,5-naphthalenediol and 2 ml morpholine and stirred at room temperature for one hour. The reaction was then vacuum stripped to remove the water and the morpholine. The blue tint was then cut the desired absorbency and bottled.

EXAMPLE 34

Synthesis of N,N-bis(hydroxyethylpolyoxyethylenepolyoxypropylene)-4-aminoaniline dicyanomethine Tint (XXXIV)

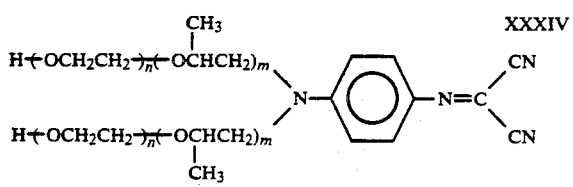

A charge of 287 g N,N-bis(hydroxyethylpolyoxyethylenepolyoxypropylene)-4-nitrosoaniline (XII, n=15, m=15) was cut to a 55.6% solution in water, was mixed with 6.6 g malononitrile and 20.0 ml morpholine and heated to 50° C. for one hour. The reaction was then vacuum stripped to remove the water and the morpholine. The orange tint was then cut the desired absorbency and bottled.

EXAMPLE 35

Synthesis of N,N-bis(hydroxyethylpolyoxyethylene)-4-amino-m-toluidine 2-cyano-2′-cyanobenzylidene Tint (XXXV)

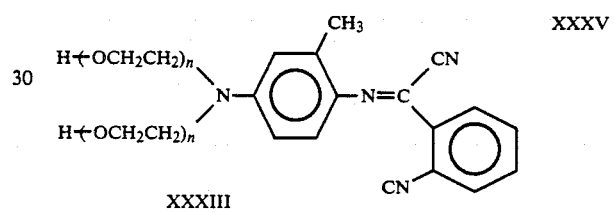

A solution of 177.5 g of 55% N,N-bis(hydroxyethylpolyoxyethylene)-4-nitroso-m-toluidine (VI, n=100) in water was mixed with 1.4 g 2-cyano-o-tolunitrile and 2 ml morpholine and heated to 75° C. for two hours. The reaction was then vacuum stripped to remove the water and the morpholine. The red tint was then cut the desired absorbency and bottled.

EXAMPLE 36

Fugitivity Testing of Acid Labile Tints

A test was constructed which would simulate actual processing conditions that textile materials would encounter during heat setting, tufting, and continuous dying in order to make carpet. This test was used to determine the fugitivity of various tints when they were subjected to these conditions.

First, 4 inch by 4 inch undyed squares of nylon carpet were cut, and the level of color on them was determined using a Hunter Labscan Colorimeter. The samples were then sprayed with a tint solution such that around 0.5% by weight tint was applied to the carpet square. The samples were allowed to dry overnight and were then read on the colorimeter again. The samples were then heat set in an autoclave, read again on the colorimeter, and allowed to age for one week. They were then dipped in an acid solution (pH 5) for 30 seconds and then vacuumed. They were dipped in a more acidic solution (pH 2.2) and allowed to drain. Both acid solutions were at room temperature. The samples were sprayed twice with water and vacuumed. They were then steamed and vacuumed a final time. The wet samples were dried in a convection oven and read one last time on a colorimeter. The results of this last color measurement were compared to the second. A five point scale was developed in which a score of 5.00 indicates that the tint was 100% fugitive, and the carpet square returned to its completely white shade. The results for the Acid Labile Tints were then compare to the Versatint commercial tints which currently represent the state of the art for fugitive tints. (Table 1)

TABLE 1

| Tint | Score |
| --- | --- |
| Yellows | |
| Versatint Yellow II | 2.56 |
| Structure XXVII | 4.08 |
| Structure XXI | 3.14 |
| Structure XXX | 3.24 |
| Reds | |
| Versatint Red II | 1.74 |
| Structure XXII | 3.14 |
| Structure XXX | 3.60 |
| Oranges | |
| Versatint Orange II | 2.36 |
| Structure XXIV | 4.27 |
| Structure XXV | 2.76 |
| Structure XXVIII | 3.88 |
| Purples | |
| Versatint Purple II | 1.39 |
| Structure XXXI | 2.35 |
| Structure XXXII | 2.29 |
| Blues | |
| Versatint Blue II | 1.25 |
| Structure XXIII | 1.91 |

EXAMPLE 37

Test for Application as an Acid Labile Ink

Five parts of the colorants listed below, 15 parts glycerin and, 80 parts deionized water were weighed into a container and mixed. Using a syringe 2 ml of each ink were placed into the transorb of an assembled pen. The end caps were placed on the pens and the pens were inverted in the writing position. After setting for 0.5 hours the pens were used to make a series of stripes on white 8.5"×1141 paper. The paper was allowed to dry. Using a cotton tipped swab, a 5% sulfuric acid solution was striped over portions of the stripes and the results were noted.

| Defined Colorant Structure | Mark on Paper | After Acid Contact |
| --- | --- | --- |
| Example # XXIX | Red | Colorless |
| Example # XXXV | Red | Colorless |
| Example # XXII | Red | Colorless |
| Example # XXV | Orange | No Effect |

There are, of course, many obvious modifications and alternate embodiments of the invention which are intended to be included within the scope of the following claims.

What we claim is:

1. A process for providing temporary coloration to an article, comprising the steps of:
    applying a solution of a colorant to an article in an amount sufficient to provide coloration to said article, wherein said colorant is a polyoxyalkylene-substituted chromophore and said chromophore is selected from azomethine and indophenol chromophores, said chromophore further having a carbon-nitrogen pair joined by a double bond and characterized by an electron withdrawing group bonded to one element of said pair and an electron donating group bonded to an opposite element of said pair and said polyoxyalkylene substitutent is a straight or branched polymer chain having at least 10 monomer units selected from ethylene oxide, propylene oxide and glycidol;
    maintaining said application of said colorant to provide coloration for said article for a desired length of time; and
    hydrolyzing said carbon-nitrogen pair of said chromophore by contacting said colorant with an aqueous acid having a pH of five or less to extinguish said colorant.

2. A process according to claim 1, wherein said electron withdrawing group is selected from $NO_2$, CN, cyanophenyl, nitrophenyl, alkyl ester, ketone, aryl ester, aldehyde, sulfonic acid, carboxylic acid, ammonium ion and vinyl ketone groups, and said electron donating group is selected from arylamine, arylalkoxide and alkylaryl groups.

3. A process according to claim 2, wherein solution is aqueous.

4. A process according to claim 3, wherein said colorant comprises one or more of said polyoxyalkylene-substituents which together have a total of between 50 to 400 of said monomer units and at least fifty percent of said monomer units are ethylene oxide.

5. A process according to claim 4, wherein said colorant comprise from 0.5 to 50 weight percent of said solution.

6. A process according to claim 4, wherein said pH of said aqueous acid is 3 or less.

7. A process according to claim 4, wherein said polyoxyalkylene substituent is covalently bonded to said chromophore by a group selected from N, O, S, $CO_2$, $SO_2$, $SO_2N$ and CON.

8. A process according to claim 4, wherein said chromophore is an azomethine.

9. A process according to claim 2, wherein said colorant comprises one or more of said polyoxyalkylene-substituents which together have a total of between 50 to 400 of said monomer units and at least fifty percent of said monomer units are ethylene oxide.

10. A process according to claim 1, wherein solution is aqueous.

11. A process according to claim 10, wherein said colorant comprises one or more of said polyoxyalkylene-substituents which together have a total of between 50 to 400 of said monomer units and at least seventy five percent of said monomer units are ethylene oxide.

12. A process according to claim 1, wherein said colorant comprises one or more of said polyoxyalkylene-substituents which together have a total of between 50 to 400 of said monomer units and at least fifty percent of said monomer units are ethylene oxide.

13. A process according to claim 12, wherein said solution comprises a solvent selected from water and propylene glycol.

14. A process according to claim 13, wherein said article is a textile fiber selected from synthetic polyamide, cotton, wool and silk fibers.

15. A process according to claim 14, wherein said textile fiber is selected from nylon 6 and nylon 6,6 fibers.

16. A process for providing temporary coloration to an article, comprising the steps of:

applying a solution of a colorant to an article in an amount sufficient to provide coloration to said article, wherein said colorant is selected from compounds of the formula:

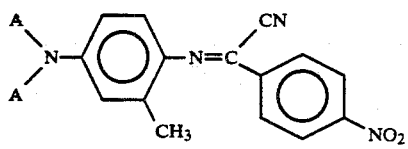

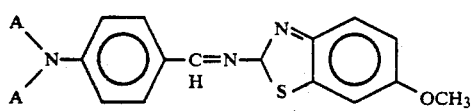

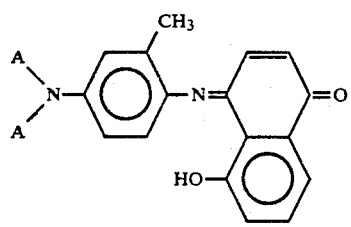

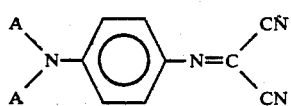

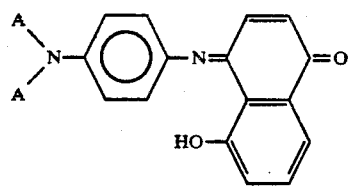

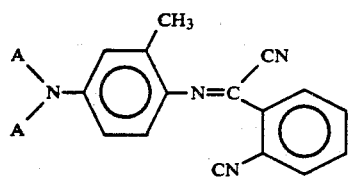

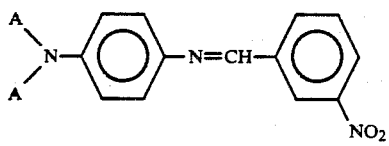

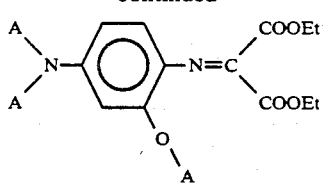

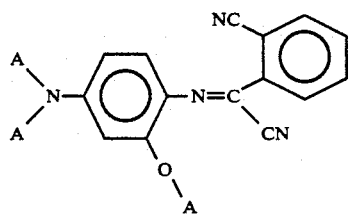

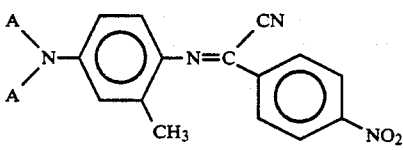

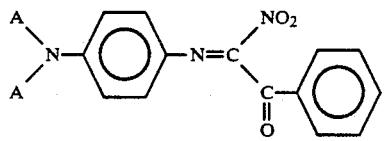

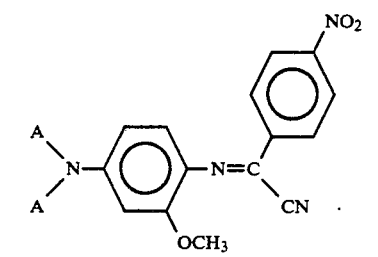

wherein A is a polyoxyalkylene substituent having a straight or branched polymer chain of at least 10 monomer units selected from ethylene oxide, propylene oxide, and glycidol;

maintaining said application of said colorant to provide coloration of said article for a desired length of time; and hydrolyzing said carbon-nitrogen pair of said chromophore by contacting said colorant with an aqueous acid having a pH of five or less to extinguish said colorant.

17. A process according to claim 16, wherein solution is aqueous.

18. A process according to claim 17, wherein said colorant comprises one or more of said polyoxyalkylene-substituents which together have a total of between 50 to 400 of said monomer units and at least seventy five percent of said monomer units are ethylene oxide.

19. A process according to claim 16, wherein said colorant comprises one or more of said polyoxyalkylene-substituents which together have a total of between 50 to 400 of said monomer units and at least fifty percent of said monomer units are ethylene oxide.

20. A process according to claim 19, wherein said solution comprises a solvent selected from water and propylene glycol.

21. A process according to claim 18, wherein solution is aqueous.

22. A process according to claim 21, wherein said colorant comprises from 0.5 to 50 weight percent of said solution.

23. A process according to claim 21, wherein said pH of said aqueous acid is 3 or less.

24. A process according to claim 23, wherein said colorant has the formula:

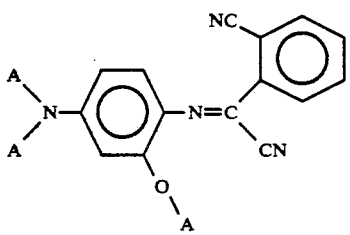

25. A process according to claim 21, wherein said article is a textile fiber.

26. A process according to claim 25, wherein said textile fiber is selected from synthetic polyamide, cotton, wool and silk.

27. A process according to claim 25, wherein said textile fiber is selected from nylon 6 and nylon 6,6.

28. A process for providing temporary coloration of a textile fiber comprising the steps of:
applying a solution of a colorant to said fiber in an amount sufficient to provide coloration to said fiber, wherein said colorant is a polyoxyalkylene-substituted chromophore and said chromophore is selected from azomethine and indophenol chromophores, said chromophore further having a carbon-nitrogen pair joined by a double bond and characterized by an electron withdrawing group bonded to one element of said pair, wherein said electron withdrawing group is selected from $NO_2$, CN, cyanophenyl, nitrophenyl, alkyl ester, ketone, aryl ester, aldehyde, sulfonic acid, carboxylic acid, ammonium ion and vinyl ketone groups, and an electron denoting group bonded to an opposite element of said pair, wherein said electron donating group is selected from arylamine, arylalkoxide and alkylaryl groups, and said polyoxyalkylene substituent is a straight or branched polymer chain having at least 10 monomer units selected from ethylene oxide, propylene oxide and glycidol;
allowing said colorant to remain on said fiber for a sufficient length of time to identify said fiber based upon said coloration; and
hydrolyzing said carbon-nitrogen pair of said chromophore by contacting said colorant with an aqueous acid having a pH of five or less to decolorize said colorant.

29. A process according to claim 28, wherein solution is aqueous.

30. A process according to claim 29, wherein said colorant comprises one or more of said polyoxyalkylene-substituents which together have a total of between 50 to 400 of said monomer units and at least seventy five percent of said monomer units are ethylene oxide.

31. A process according to claim 28, wherein said colorant comprises one or more of said polyoxyalkylene-substituents which together have a total of between 50 to 400 of said monomer units and at least fifty percent of said monomer units are ethylene oxide.

32. A process according to claim 31, wherein solution is aqueous.

33. A process according to claim 32, wherein said textile fiber is selected from synthetic polyamide, cotton, wool and silk.

34. A process according to claim 32, wherein said colorant comprises from 0.5 to 50 weight percent of said solution.

35. A process according to claim 32, wherein said pH of said aqueous acid is 3 or less.

36. A process according to claim 32, wherein said polyoxyalkylene substituent is covalently bonded to said chromophore by a group selected from N, O, S, $CO_2$, $SO_2$, $SO_2N$ and CON.

* * * * *

UNITED STATES PATENT AND TRADEMARK OFFICE
CERTIFICATE OF CORRECTION

PATENT NO. : 5,071,440

DATED : December 10, 1991

INVENTOR(S) : John B. Hines and John G. Lever

It is certified that error appears in the above-identified patent and that said Letters Patent is hereby corrected as shown below:

On the Title page, item [57], col. 2,
In Line 3 of the Abstract: delete "N═pair", insert "C═N pair"

Signed and Sealed this

Ninth Day of November, 1993

Attest:

BRUCE LEHMAN

Attesting Officer

Commissioner of Patents and Trademarks